United States Patent
Wang

[19]

[11] Patent Number: 6,069,715
[45] Date of Patent: May 30, 2000

[54] IMAGE SCANNING DEVICE

[75] Inventor: Jin-Dar Wang, Hsinchu, Taiwan

[73] Assignee: Microtek International Inc., Hsinchu, Taiwan

[21] Appl. No.: 08/992,245

[22] Filed: Dec. 17, 1997

[30] Foreign Application Priority Data

Oct. 14, 1997 [TW] Taiwan .................................. 86217330

[51] Int. Cl.[7] ...................................................... H04N 1/04
[52] U.S. Cl. ............................. 358/498; 358/474; 358/496
[58] Field of Search .................................... 358/498, 497, 358/494, 496, 406, 400, 474, 401; 399/367, 205, 215, 364, 374; 355/23, 24

[56] References Cited

U.S. PATENT DOCUMENTS

| | | | |
|---|---|---|---|
| 4,908,719 | 3/1990 | Nonoyama ................................ | 358/494 |
| 4,958,187 | 9/1990 | Tsuchiya et al. ........................ | 355/202 |
| 5,136,665 | 8/1992 | Inoue ....................................... | 358/408 |
| 5,251,072 | 10/1993 | Fukuoka et al. ......................... | 358/487 |
| 5,282,050 | 1/1994 | Ishizuka et al. ......................... | 358/400 |
| 5,379,095 | 1/1995 | Oishi ....................................... | 355/233 |
| 5,568,573 | 10/1996 | Wada et al. .............................. | 382/317 |
| 5,619,343 | 4/1997 | Amemiya ................................. | 358/408 |

*Primary Examiner*—Joseph Mancuso
*Assistant Examiner*—Hien Truong
*Attorney, Agent, or Firm*—Bacon & Thomas

[57] ABSTRACT

An image scanner capable of scanning double-sided documents or of being divided into two single-sided scanners includes a main body with an automatic document feeder and an image capture device, a base, and a flatbed scanner with its own image capture device. The main body can be secured either to the base, in which case a sheet fed single-sided scanner is formed, or to the flatbed scanner, in which case a double-sided scanner is formed. The automatic document feeder eliminates the need for a transparent document thin film guide by using the top surface of the base or of the flatbed scanner to guide a document past the image capture device and onto a guiding plate extending at a non-zero angle from the main body and into a groove in either the base or the flatbed scanner, the groove receiving the guiding plate so that the guiding plate extends into the path of the document to guide the document into an output tray.

6 Claims, 10 Drawing Sheets

IMAGE SCANNING DEVICE

BACKGROUND OF THE INVENTION

1. Field of the Invention

The present invention relates to an image scanner (briefly called a scanner), and especially to the scanner with an automatic document feeder (ADF) and single-side/double-side document scanning modes.

2. Description of the Related Art

A prior art flat-bed scanner 1 with ADF is shown in FIG. 1. The scanner 1 contains an optional automatic document feeder (ADF) 11 and a scanner body 12. The ADF 11 can feed a plurality of document sheets in a document input tray one by one into the scanner body 12. In addition, there exist two fixing posts 14 and an electric connector 15 in the ADF 11. The fixing posts 14 are plugged into the related plug-in holes 16 to mechanically secure the ADF 11 on the flat bed of the scanner 1, and the electric connector 15 is connected to the other electric connector 17 to communicate with scanner 1.

FIG. 2 is a side view of the ADF 11 described above. The stacked plurality of document sheets (not shown in FIG. 1) are put into the document input tray 13 in order. With the cooperation of the document separating roller 111 and the pressing plate 112, the first document sheet on the top is separated from the other document sheets and then is fed into the document sliding channel 115 for scanning, and then this document sheet is transported forward into the document output tray 18 by a couple of document enter rollers 113 and a couple of document exit rollers 114. Under the bottom of the document sliding channel 115 in the ADF 11, there is a scanning slit which serves as the document scanning window, as shown in FIG. 2. In order to let a document sheet smoothly pass through the document scanning window and successfully enter the rear section of the document sliding channel 115, there is a transparent thin film guide 116 under the document scanning window in the bottom of the scanner body 12 to connect the front and rear sections of the document sliding channel 115.

FIG. 3 is an exploded perspective view of a double-side scanner 2 of the prior art. The double-side scanner 2 contains an automatic document feeder (ADF), a upper side digital image capture device 22 and a underside digital image capture device 23, while the ADF contains a plurality of document feeding rollers 24, 25, 26, and 27, a document input tray 28 and a document output tray 29. The stacked plurality of document sheets are put in the document input tray 28. With the document separating mechanism, the first document sheet is separated from the other document sheets. Then, the document sheet is transported through the document sliding channel between the upside digital image capture device 22 and the underside digital image capture device 23 by using the document feeding rollers 24, 25, 26, and 27. Consequently, the double sides of the document sheet are scanned. Finally, the document sheet is delivered into the document output tray 29.

OBJECTIVE OF THE INVENTION

In FIG. 1 and 2, since the moving document sheet directly contacts the transparent thin film guide 116, the transparent thin film guide 116 is easily frayed after being used for an extended time and its transparency will be consequently reduced. Hence, the image scanning quality will be decayed by the fogged transparent thin film guide 116. Although the transparent thin film guide 116 can be replaced with a new one by users, this action will induce the following problems:

1. the replacing action will result in inconvenience of users;
2. the transparent thin film guide 116 is attached by a double-side adhesive tape, and hence, because of residual adhesive tape, the new transparent thin film guide will not be pasted smoothly or at a correct location, and will therefore hinder document feeding in the ADF 11.

The double-side scanner of the prior art is an all-build-in-one design, i.e., all components of the scanner are built in a machine and they cannot be separated. With the ADF and upper side and underside digital image capture devices, users can scan the double sides of a plurality of documents simultaneously. As the scanner just enables one digital image capture device, it can scan one side of a document sheet. However, the all-build-in-one design, the double-side scanner cannot be divided into two single-side scanners. This limits the double-side scanner's function.

One objective of the present invention is that a new ADF mechanism without any transparent thin guide film is introduced. The ADF of the present invention can solve the drawbacks of the prior art by using a document guiding plate for connecting the document sliding channel, which reduces the inconvenience of users and the poor scanning quality.

The other objective of the present invention is that the new of ADF mechanism with a scanning module solves the drawback of the double-side scanner of the prior art, whose function is limited by the all-build-in-one design. The scanner with the new ADF of the present invention can be divided into two single-side scanners.

SUMMARY OF THE INVENTION

The scanner of the present invention comprises a main body with automatic document feeder and image capture device, a base and a flatbed scanner. The automatic document feeder does not need the transparent thin film guide described in the prior art. A sheet-feed scanner can be built up by assembling the main body and a base, and a double-side scanner is formed by assembling the main body and a flat-bed scanner.

DETAILED DESCRIPTION OF THE PREFERRED EMBODIMENTS

Figure 4:
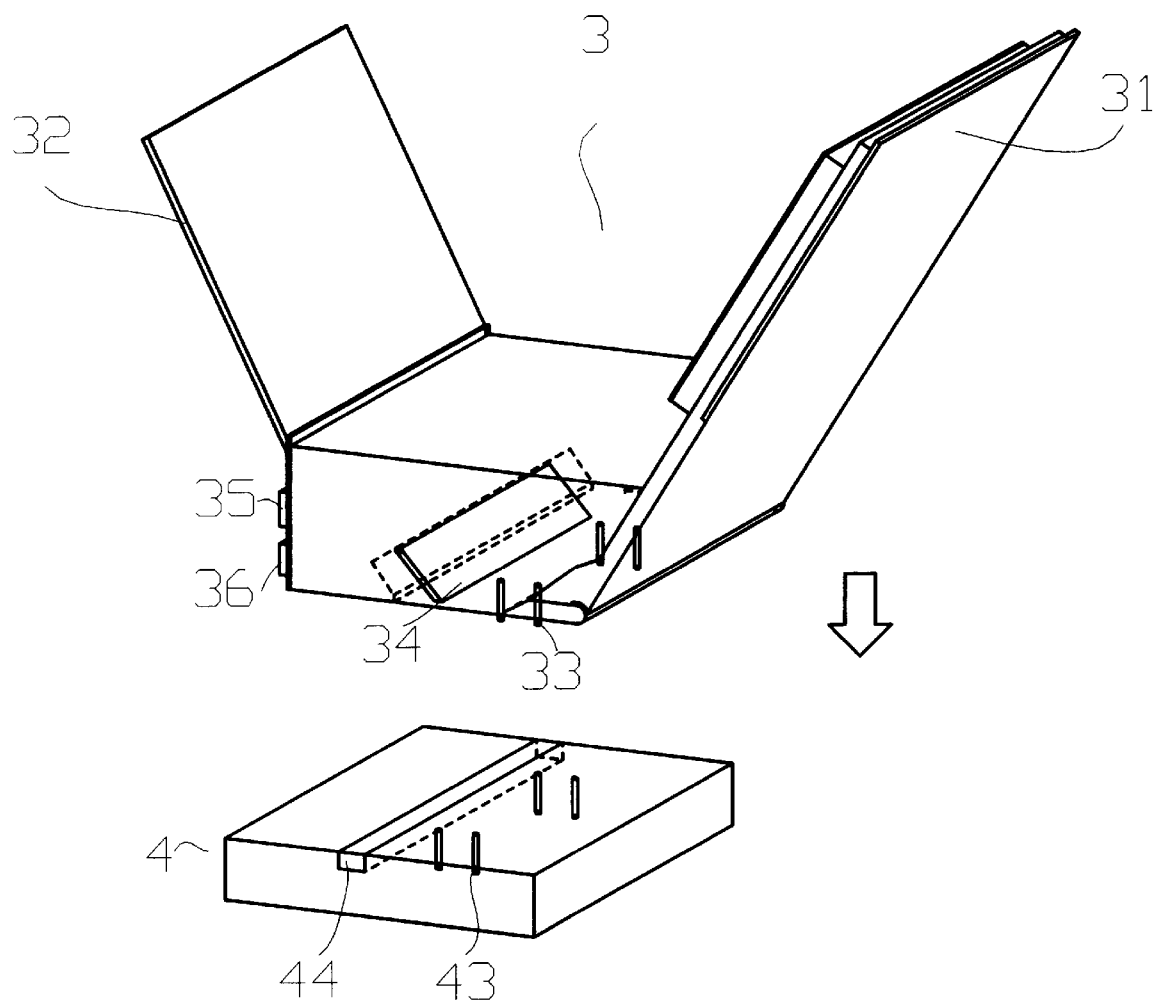
FIG. 4 is an exploded perspective view of the first preferred embodiment of the present invention.

FIG. 4 is an exploded perspective view of a scanner of the present invention. In order to clearly exhibit the characteristic of the present invention, some components of the scanner are not shown. Referred to FIG. 4 and 5, the scanner consists of an main body 3 and a base 4 for settling the main body 3 in the X direction. The main body 3 comprises an input tray for receiving the document to be scanned, an output tray for receiving the document scanned, document feeding mechanism for feeding the document from the input tray to the output tray through a document channel, a digital image capture device (shown in FIG. 5) for capturing the document image passing through the channel, a plurality of posts 33, document guiding plate 34 and connector 35,36. The base 4 has a plate receiving groove 44 at the location related to the document guiding plate 34 and a plurality of plug-in holes 43 at the locations related to the fixing posts 33. The plurality of fixing posts 33 extend down from the main body's bottom surface. The document guiding plate 34 extends from the channel and is exposed outside the main body 3 bottom at an inclined (non-zero) angle. The posts 33 plug into the plug-in holes 43 for securing the main body 3 on the base 4. The lower part of the document guiding plate 34 is inserted into the guide-plate groove 44 at the inclined angle. The power port 35 supports the electric power of the scanner, and the signal port 36 is connected to a personal computer (PC) or a flat-bed scanner. Since the main body 3 has a digital image capture device, it and the base 4 are assembled to form a sheet-feed scanner, which can be used to scan a single-side of a document sheet.

Figure 5:
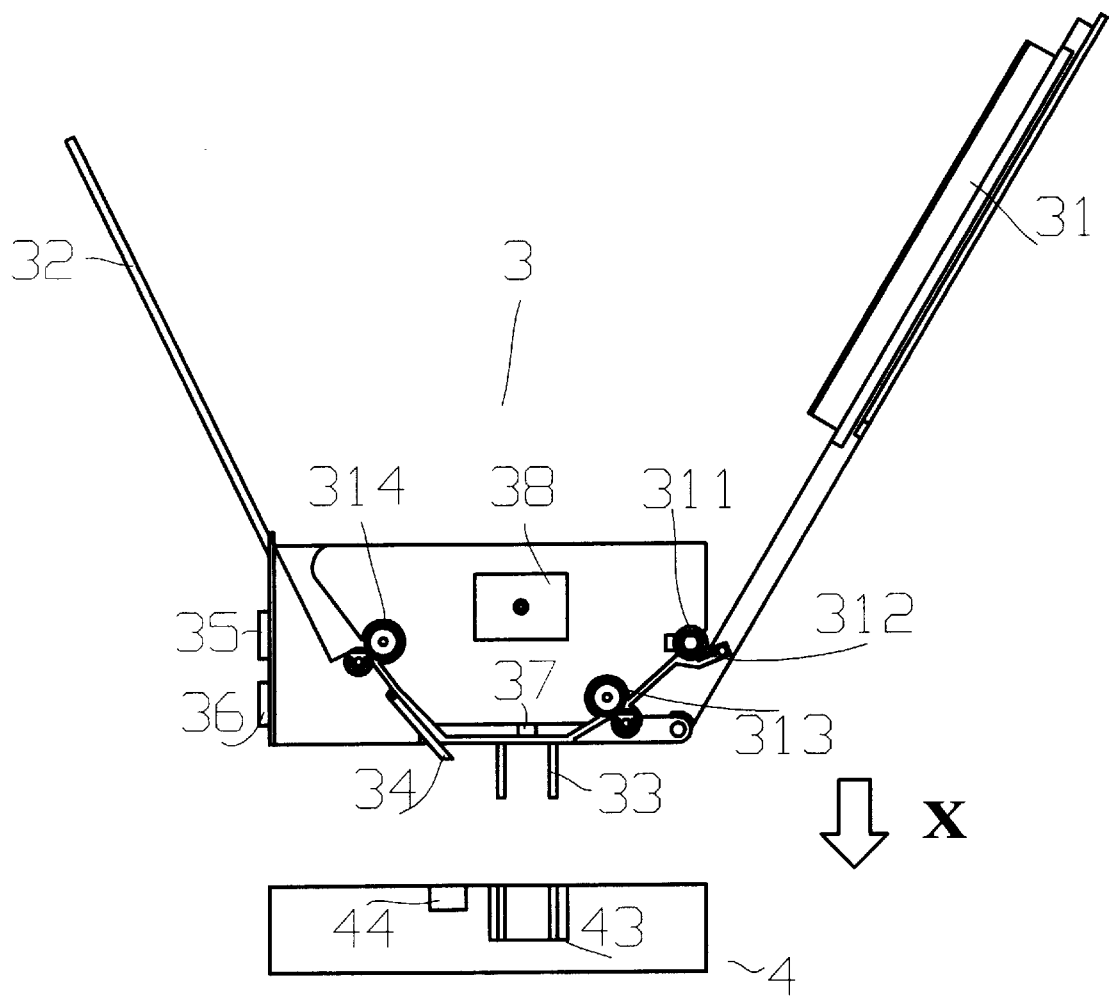
FIG. 5 is an exploded side view of the first embodiment of the present invention.
Figure 6:
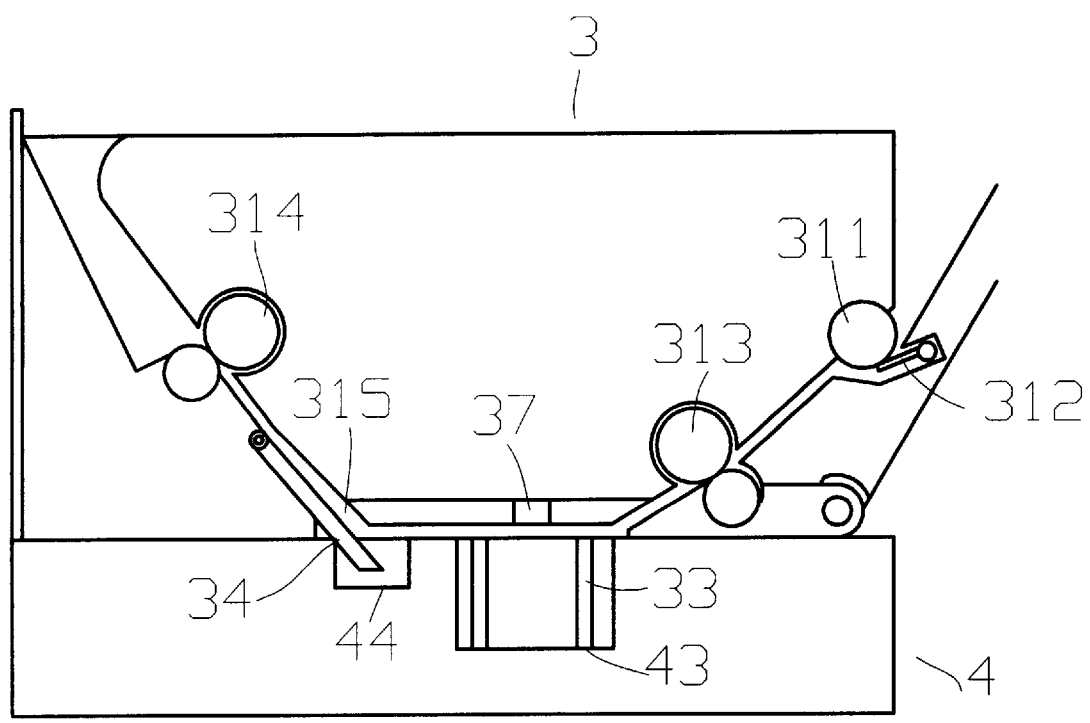
FIG. 6 is a side view of an essential part of the first embodiment according to the present invention.

FIGS. 5 and 6 describe the operating steps of the scanner of the present invention. First, plug the fixing posts 33 of the main body 3 into the plug-in holes 43 of the base 4, and, at the same time, the document guiding plate 34 is located in the guide-plate groove 44. Then, the scanner is switched to the single-scanner mode as a single image scanning machine, and the signal connecting port 36 is connected to a PC for transferring the control signal and scanning data.

The connecting relation of the main body 3 and the base 4 is best illustrated in FIG. 6. The document guiding plate 34 is fixed to the channel the main body at an inclined angle. The lower part of the document guiding plate 34, which is exposed outside the main body's bottom surface, is inserted into the guide-plate groove 44. There exists an angle between the document guiding plate 34 and the top surface of the base 4, such as 130 degrees. Therefore, when the document on the surface of base 4 touches the guiding plate 34, this document will be guided toward the output tray along the guiding plate 34. The document feeding mechanism contains a document separating roller 311, a pressing plate 312, a couple of document enter rollers 313, a couple of document exit rollers 314 and, a driving motor 38. The driving motor 38 is used to drive separating roller 311, document enter rollers 313, and document exit rollers 314. The top sheet of a plurality of documents in the input tray is separated by separating roller 311 and pressing plate 312, and then is fed by enter rollers 313. In the main body 3, there is a document sliding channel 315 extending from input tray 31 to output tray 32, and having a the front section and rear section. Under the image capture device 37, the channel 315 has an opened section as the scanning window.

Referred to FIGS. 5 and 6, the step of separating and feeding a document sheet is illustrated. Some stacked document sheets are put in the document input tray 31, and a document sheet on the top of the stacked document sheets is then separated and fed into the front section of the document sliding channel 315 by the document separating roller 311 and the pressing plate 312. Transported by the document enter rollers 313, the document sheet is continuously fed into the opened section of the document sliding channel 315 and smoothly slides on the top surface of the base 4. The digital image capture device 37 catches the image of the document sheet from the scanning window during the document feeding. Since there exists an inclined angle between the document guiding plate 34 and the top surface of the base 4, when the front edge of the document sheet touches the document guiding plate 34, this document sheet is fed into the rear section of the document sliding channel 315 toward the output tray 32. Then, the document exit rollers 314 deliver the document sheet to the output tray 32, and the single-side image scanning procedure of the scanner in the single-scanner mode is finished.

Figure 7:
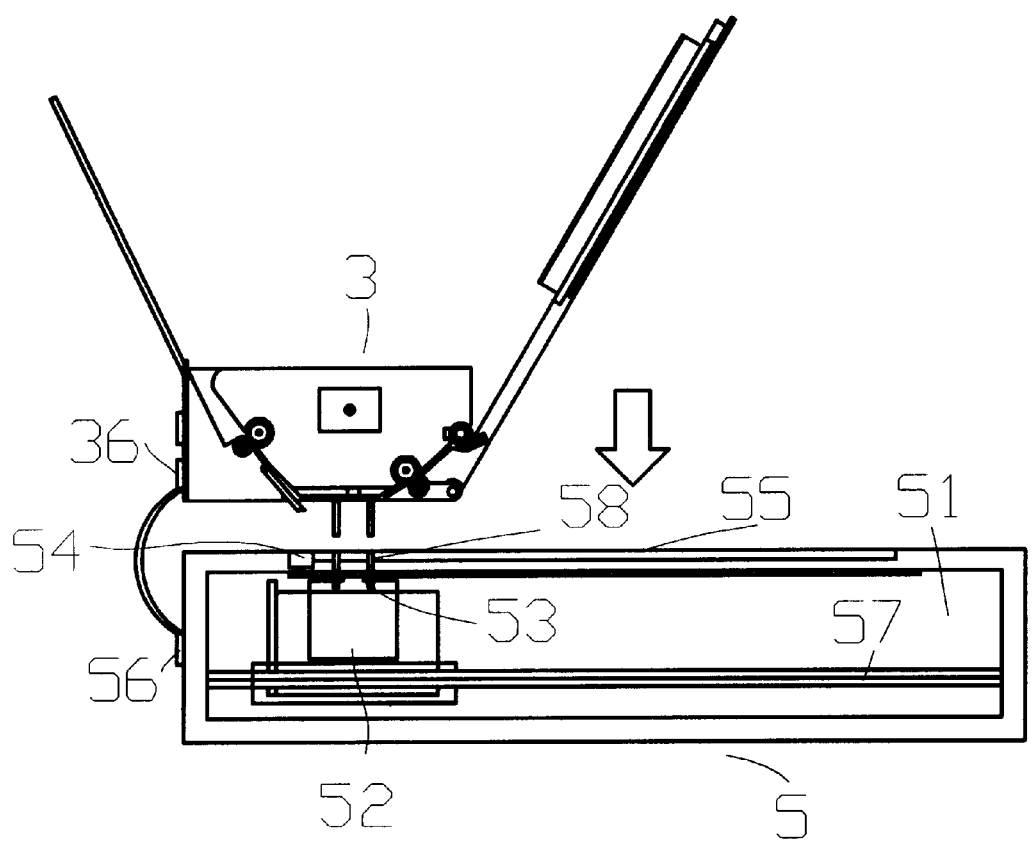
FIG. 7 is an exploded side view of a scanner built on a flat-bed scanner of the present invention.
Figure 8:
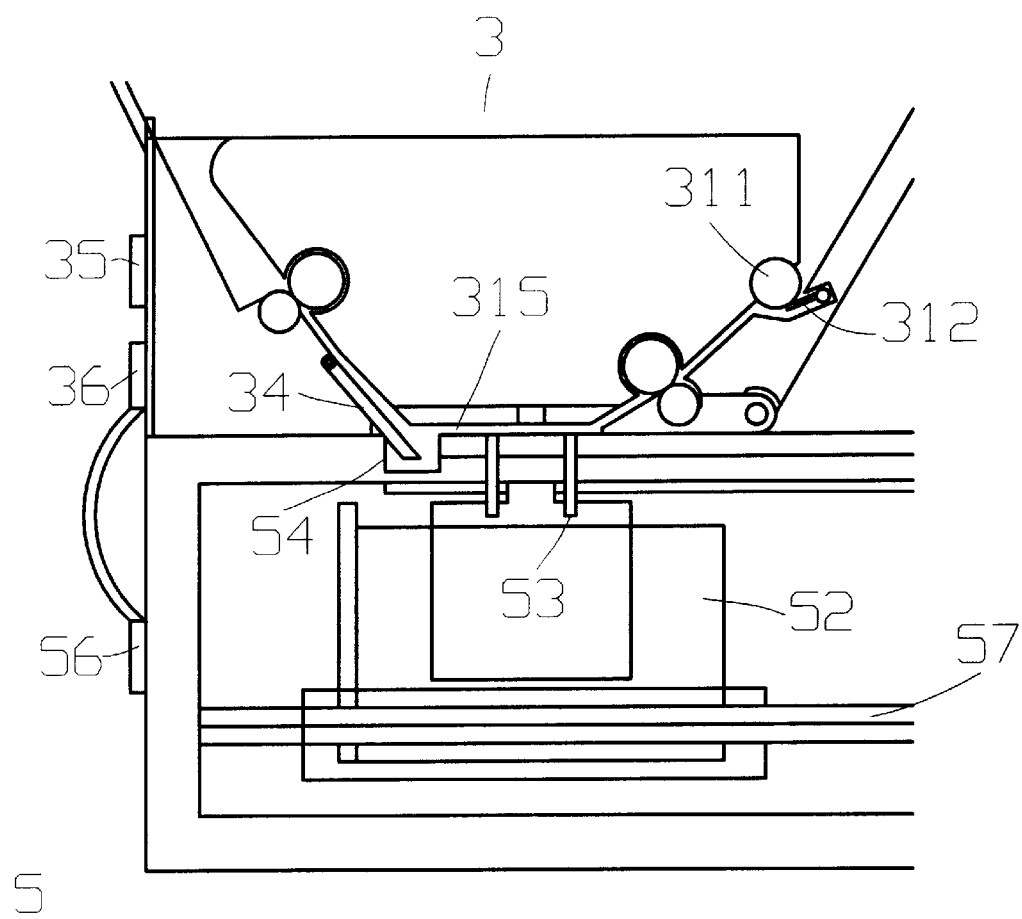
FIG. 8 is a side view of an essential part of the scanner shown in FIG. 7.

Referred to FIG. 7 and 8, the second preferred embodiment of the present invention is a double-side scanner which can scan both sides of a document sheet simultaneously. The double-side scanner is built up by assembling a main body 3 on a flat-bed scanner 5. The flat-bed scanner is similar to that of the prior art, which contains a scanner's housing 51, a movable carriage 52, a sliding guide 57, and the other components. The differences between the present invention and the prior art are that the scanner 5 further includes holes 58 on the two sides of the top plane 55 of the housing 51 and some plug-in holes 53 on the image-scan carriage 52 at the locations corresponding to the fixing posts 33 of the main body 3. In addition, a guide-plate groove 54 is located near one side of the flat glass of the top plane 55, which is used to receive the document guiding plate 34 of the main body 3 (as shown in FIG. 8). Because the main body 3 and the flat-bed scanner 5 have their own digital image capture devices respectively, the double sides of a document sheet fed by main body 3 can be scanned simultaneously.

When users want to scan the double sides of documents simultaneously, he can settle the main body 3 on the flatbed scanner 5 by inserting the posts 33 of the main body 3 into the plug-in holes 53 of the image-scan carriage 52 through the opened holes 58 on the top plane 55. At the same time, the document guiding plate 34 is inserted into the guide-plate groove 54 of the top plane 55 with an inclined angle. The main body 3 is then switched to the two-scanner mode as a scanning machine with two scanners, and the signal connecting port 36 of the main body 3 is connected to the signal connecting port 56 of the flat-bed scanner 5 for transferring the control signal and scanning data. Since the main body 3 is directly secured on the carriage 52 of the flat-bed scanner 5, the scanning window of the main body 3 are directly aligned with the digital image capture device's window on the carriage 52 of the flat-bed scanner 5 (as shown in FIG. 8).

Referred to FIGS. 7 and 8, the step of separating and feeding a document sheet is illustrated. Some stacked document sheets are put in the document input tray 31, and a document sheet on the top of the stacked document sheets is then separated and fed into the front section of the document sliding channel 315 by the document separating roller 311 and the pressing plate 312. Transported by the document enter rollers 313, the document sheet is continuously fed into the opened section of the document sliding channel 315 and smoothly slides on the top plane 55 of the flat-bed scanner 5. During movement of the document on the top plane 55, the image capture device 37 of the main body 3 and the digital image capture device of the carriage 52 catch the double-sides image of this document sheet. Since there exists an angle between the document guiding plate 34 and the top plane 55 of the flat-bed scanner 5, when the front edge of the document sheet touches the document guiding plate 34, this document is guided by the guiding plate 34 and moved toward the output tray 32. Then, the document exit rollers 314 deliver the document sheet to the output tray 32, and the double-side image scanning procedure of the scanner in the two-scanner mode is finished.

In addition, if the main body 3 does not have an image capture device, it can also be used as a ADF of the flat-bed scanner 5 without any scanning function. The operating steps of this scanner are the same as those of the double-side scanner shown above, but it scans only one side of documents.

Figure 9:
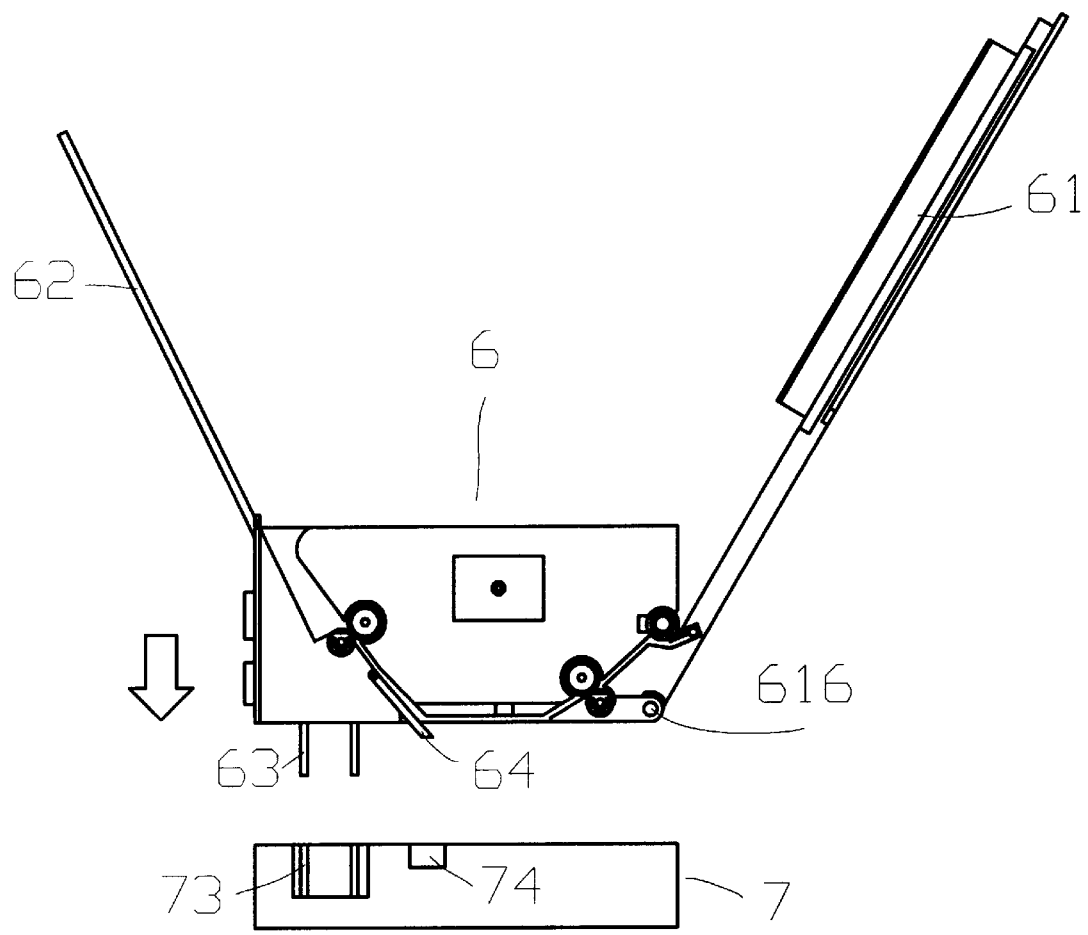
FIG. 9 is an exploded side view of the second embodiment of the present invention.

FIG. 9 is a side view of a preferred embodiment of the present invention. In FIG. 9, the components of the main body 6 are the same as those of the main body 3 shown in FIG. 5. The difference is that the locations of the posts 63 are between the document guiding plate 64 and the signal connecting port. The components of the base 7 in FIG. 9 are similar to those of the base 4 in FIG. 5. The difference is that the related location of the plug-in holes 73 and the guide-plate groove 74 is changed. In the single-scanner mode of the present embodiment, the set-up, feeding, and scanning steps are the same as those of the embodiment shown in FIG. 4, and does not need to be described again.

Figure 1:
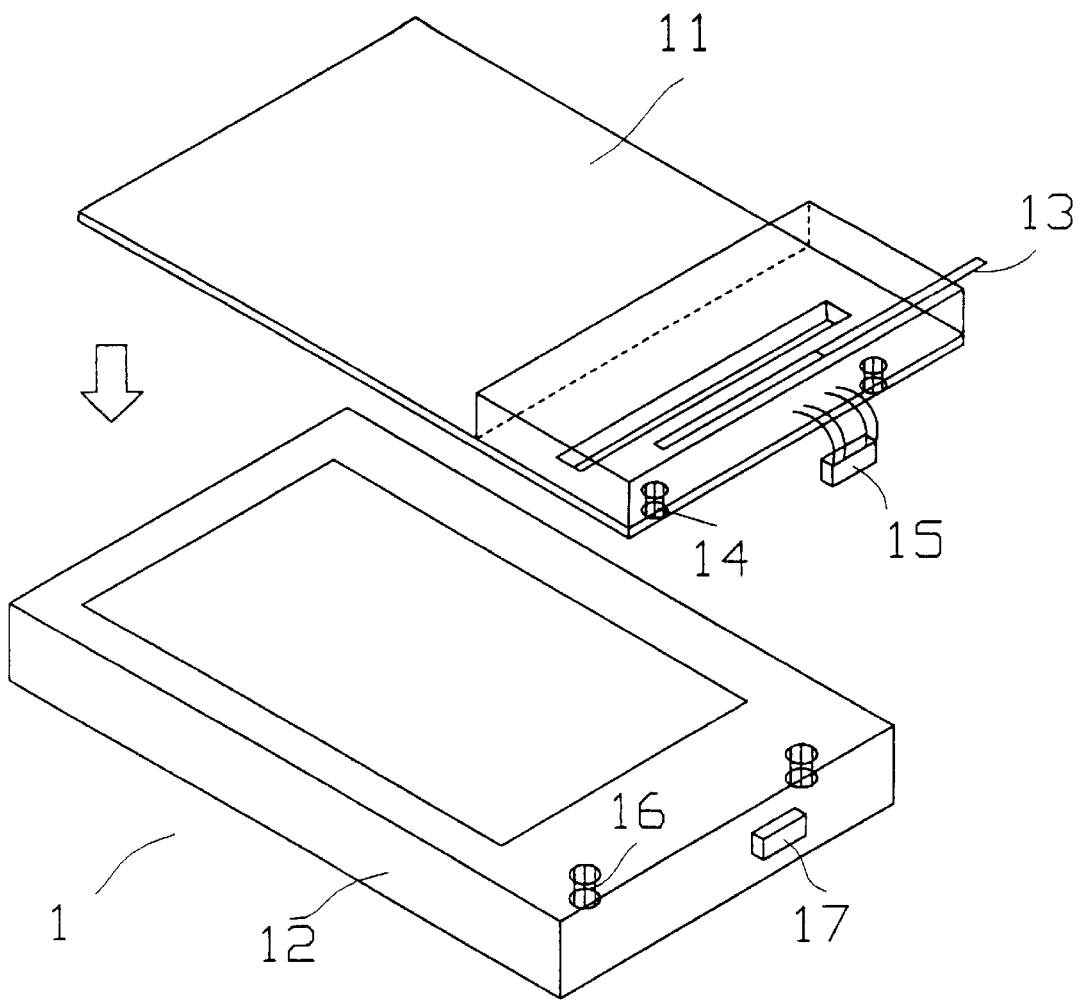
FIG. 1 is an exploded perspective view of a scanner with an automatic document feeder (ADF) of the prior art.
Figure 2:
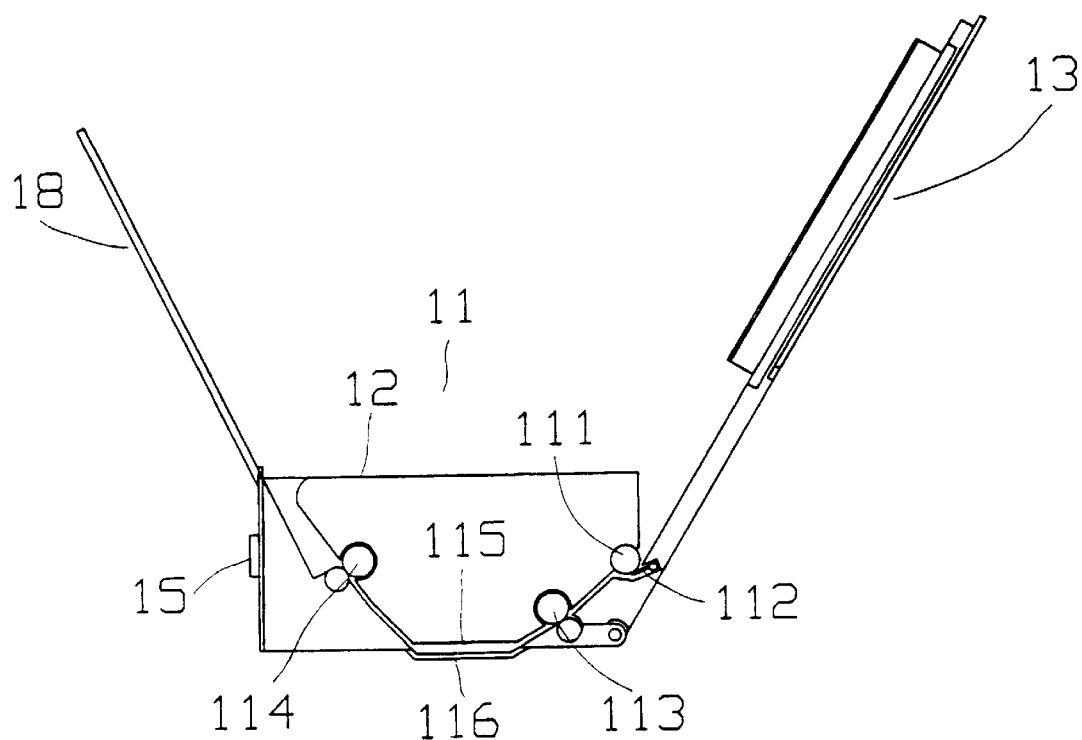
FIG. 2 is a side view of the ADF shown in FIG. 1.
Figure 3:
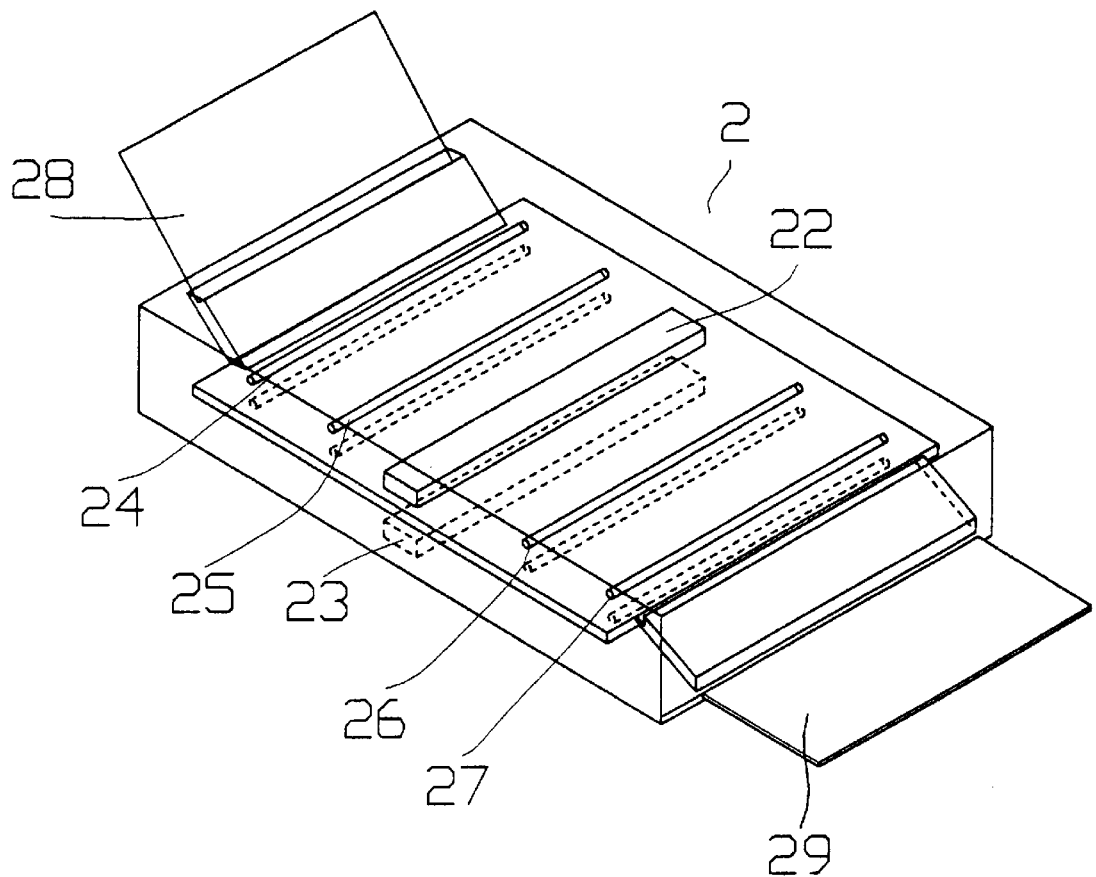
FIG. 3 is a perspective view of a double-side scanner of the prior art.
Figure 10:
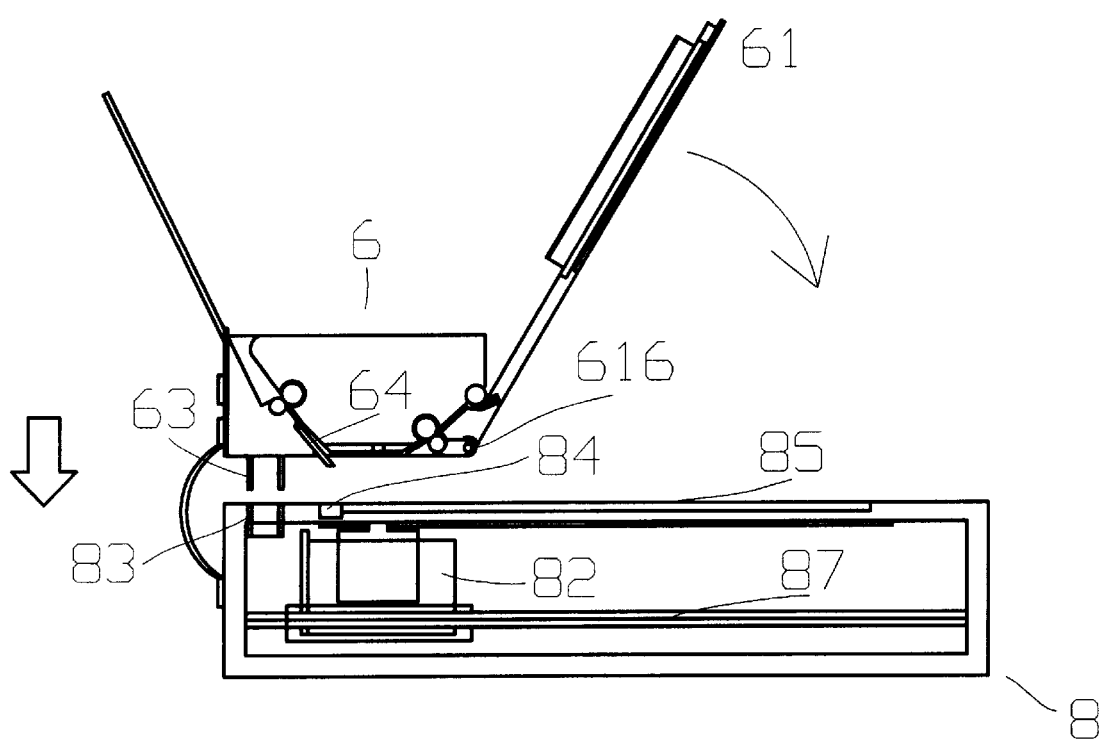
FIG. 10 is a side view of an essential part of the second embodiment according to the present invention.

FIG. 10 is also a side view of a preferred embodiment of the present invention. The present embodiment is set up by putting the main body 6 in FIG. 9 on a flat-bed scanner 8 in FIG. 10, so that it possesses the function to scanning one side or two sides of documents. The set-up, feeding, and scanning steps are the same as those of the embodiment shown in FIG. 7, and does not need to be described again. The differences are that, in FIG. 10, the posts 63 of the main body 6 insert into the plug-in holes 83 on one side of the top plane 85 but not the movable carriage 82, and there exists a rotational axis 616 of the document input tray 61. The locations of the plug-in holes 83 are the same as the scanner shown in FIG. 1, which are at one side of the flat-bed scanner 8 in FIG. 10. The posts 63 are not inserted into the carriage 82, hence, the carriage 82 can be moved along the sliding guide 87. For scanning a document sheet, the scanning quality of a flat-bed scanner is better than a sheet-feed scanner. Therefore, without taking off the main body 6, the present embodiment can be used as a conventional flat-bed scanner by putting a document sheet on the top plane 85 of the flat-bed scanner 8 and then putting down the document input tray 61 in the clockwise direction with the axis 616.

EFFECT OF THE INVENTION

The scanner of the present invention consists of an main body with a digital image capture device and automatic document feeder, a base, and a flat-bed scanner with own image capture. It can be used as a double-side scanner or divided as two single-side scanners, one of which is sheet feed scanner and another is a flatbed scanner. Hence, the scanner of the present invention can change from single-side to double-side scanning modes and visa versa, automatically feed documents, and be used as a flat-bed scanner. In addition, since there is no transparent thin film guide used in the automatic document feeder of the scanner, the drawbacks induced by using the transparent thin film guided are eliminated.

What is claimed is:

1. An image scanner with an automatic document feeder for scanning a document, said scanner comprising:
   a housing having a document sliding channel and a scanning window formed in said channel at a bottom of said housing;
   an automatic document feeding mechanism located in said housing for automatically feeding a plurality of documents through said channel and past said scanning window one by one;
   an image reading device located in said housing above said scanning window for reading an image of a document through said scanning window;
   a plurality of posts extending from the bottom of said housing;
   a guiding plate located on the housing and extending from the bottom of the housing at a non-zero angle;
   a base to which said housing is secured, said base having plug-in holes for receiving said post and a groove for receiving said guiding plate;
   wherein one side of said document sliding channel faces a top of said base upon assembly of the housing to the base to form a path for said document through said document sliding channel,
   wherein said housing is assembled to said base by plugging said posts into plug-in holes in said base and by causing said guiding plate to extend into said groove and thereby into said document path, and
   wherein said guiding plate is thereby arranged to guide said document through said document sliding channel past said scanning window in said housing to provide single-sided scanning of said document by said image reading device.

2. The image scanner as claimed in claim 1, wherein said automatic document feeding mechanism comprises a driving motor, document separating rollers, a document separating plate, a document input tray, and a document output tray, said automatic document feeding mechanism being arranged to feed said document from said input tray to said output tray through said sliding channel.

3. The image scanner as claimed in claim 1, wherein said automatic document feeding mechanism comprises a driving motor, document separating rollers, a document separating plate, a document input tray, and a document output tray, said automatic document feeding mechanism being arranged to feed said document from said input tray to said output tray through said sliding channel.

4. The image scanner as claimed in claim 1, wherein said automatic document feeding mechanism comprises a driving motor, document separating rollers, a document separating plate, a document input tray, and a document output tray, said automatic document feeding mechanism being arranged to feed said document from said input tray to said output tray through said sliding channel.

5. An image scanner with an automatic document feeder for scanning a document, said scanner comprising:
   a housing having a document sliding channel;
   an automatic document feeding mechanism located in said housing for automatically feeding a plurality of documents through said channel and past said scanning window one by one;
   a plurality of posts extending from the bottom of said housing;
   a guiding plate located on the housing and extending from the bottom of the housing at a non-zero angle;
   a flatbed scanner to which said housing is secured, said flatbed scanner having plug-in holes for receiving said post and a groove for receiving said guiding plate;
   wherein one side of said document sliding channel faces a top of said flatbed scanner upon assembly of the housing to the flatbed scanner to form a path for said document through said document sliding channel,
   wherein said housing is assembled to said flatbed scanner by plugging said posts into plug-in holes in said flatbed scanner and by causing said guiding plate to extend into said groove at said non-zero angle and thereby into said document path, and wherein said guiding plate is thereby arranged to guide said document through said document sliding channel for scanning by said flatbed scanner.

6. An image scanner with an automatic document feeder for scanning a document, said scanner comprising:

- a housing having a document sliding channel and a scanning window formed in said channel at a bottom of said housing;
- an automatic document feeding mechanism located in said housing for automatically feeding a plurality of documents through said channel and past said scanning window one by one;
- an image reading device located in said housing above said scanning window for reading an image of a document through said scanning window;
- a plurality of posts extending from the bottom of said housing;
- a guiding plate located on the housing and extending from the bottom of the housing at a non-zero angle;
- a flatbed scanner to which said housing is secured, said flatbed scanner having plug-in holes for receiving said post and a groove for receiving said guiding plate;

wherein one side of said document sliding channel faces a top of said flatbed scanner upon assembly of the housing to the flatbed scanner to form a path for said document through said document sliding channel, wherein said housing is assembled to said flatbed scanner by plugging said posts into plug-in holes in said flatbed scanner and by causing said guiding plate to extend into said groove at said non-zero angle and thereby into said document path, and wherein said guiding plate is thereby arranged to guide said document through said document sliding channel past said scanning window in said housing, whereby said image reading device in said housing scans one side of the document and said flatbed scanner scans a second side of said document to provide double-sided document scanning.

* * * * *